Jan. 31, 1961 A. A. F. LAGERWEY 2,970,042
VESSEL WITH REPLACEABLE PLIABLE LINING
Filed Feb. 27, 1957
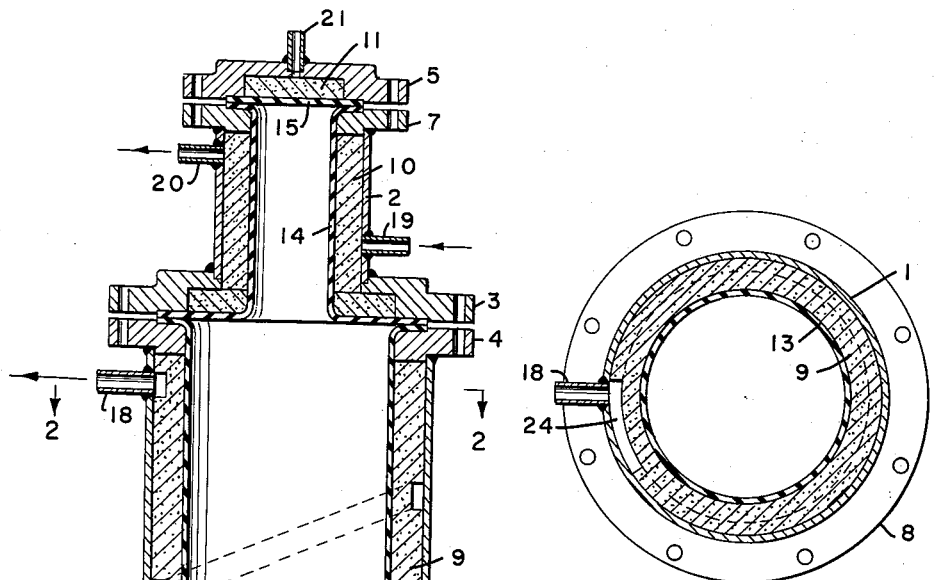
FIG. 2
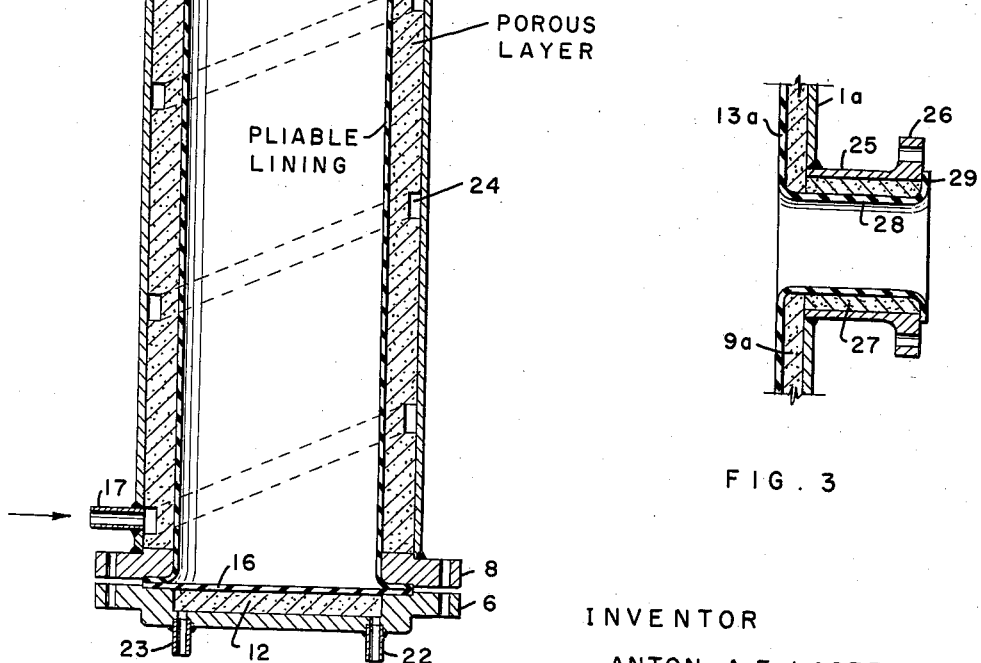
FIG. 3
FIG. 1
INVENTOR
ANTON A.F. LAGERWEY
BY Oswald H. Milmore
HIS ATTORNEY

# United States Patent Office 2,970,042
Patented Jan. 31, 1961

2,970,042
VESSEL WITH REPLACEABLE PLIABLE LINING

Anton A. F. Lagerwey, Amsterdam, Netherlands, assignor to Shell Oil Company, a corporation of Delaware Filed Feb. 27, 1957, Ser. No. 642,715

Claims priority, application Netherlands Mar. 1, 1956

9 Claims. (Cl. 23—290)

The invention relates to a lined vessel, such as a reaction vessel, tube for the flow of fluids, or a similar hollow receptacle, the inside of the walls of which is covered with a pliable lining, especially one made of plastic or other synthetic material, or of thin metal foil, etc., which may be plastic under operating conditions, the lining being separated from said walls by an intervening supporting layer which contains cavities in communication with each other, in which cavities a gas pressure prevails or may be generated which is lower than the pressure prevailing in the vessel during use.

A reaction vessel of a similar type is known from the French Patent No. 1,057,247. In this known vessel the intervening layer in which the cavities are present consists of a metal grid or perforated mat. Since the pressure in the vessel is higher than the gas pressure in the cavities and the lining is pliable, it is pressed against the grid. As the lining is pressed against the grid by the pressure prevailing in the vessel and thereby held in place, it is possible to employ linings consisting of materials which cannot be secured to the wall of a vessel by fasteners, adhesives, tabs, bolts, welding, or the like, or which can be so secured only with great difficulty.

If lining materials are used which are plastic at the operating temperatures used in the vessel, such as polyperfluoroethylene (known as Teflon), polyvinyl chloride, and the like, difficulties arise with such a metal grid or mat due to creep. Creep, as used herein, is the gradual non-elastic deformation of the lining, leading to permanent set. Such creep manifests itself by the lining's being pressed into the deep cavities or perforations in the grid or mat. Creep is experienced also with ductile metals. It is, therefore, desirable to support the lining in such a way as to avoid creeping of the lining material. A support which is well distributed over the area of the lining is very important, particularly where the lining material is used in the form of very thin plates or in the form of a foil.

The object of the invention is to provide a vessel of the type indicated in which the lining is properly supported so as to prevent creeping of the lining, and in which, if desired, the lining may be cooled in a simple way.

According to the invention this object is attained in that the supporting intervening layer consists of a pressure-resistant, porous material having a micro-rough inner surface, and the pores of which material are in communication with each other to make the layer pervious to gas.

This porous material is positioned against the inside of the impervious, enclosing walls of the reaction vessel. During use of the vessel the lining presses against the inner surface of this porous material because the pressure which prevails within the pores is always lower than the pressure in the vessel, which acts against the inner surface of the lining. This pressure relation may occur naturally or may be maintained by evacuation of gas from the pores, e.g., by means of a vacuum pump. The gas pressure in the pores may be higher than, equal to, or lower than the atmospheric pressure. The most important point is that the pressure in the pores should be lower than the gas pressure in the vessel, and if the pressure in the vessel is equal to or lower than the atmospheric pressure, it is necessary to evacuate the pores to establish and maintain therein a pressure lower than atmospheric. Owing to the micro-cavities in the porous material the lining material will not be pressed far into the pores, even when there are great differences of pressure and the lining is very plastic under the operating conditions.

The porous material may be, for example, stony material, such as concrete (including grout and neat cement) and the like. Sintered materials, such as ceramics and sintered metal may also be used. The most important point is that the material should be sufficiently porous to establish the reduced pressure throughout the inner surface thereof and sufficiently pressure-resistant to transmit the pressure of the lining to the enclosing wall. Typically, the pores at the inner surface have diameters from 5 to 1000 microns and are so spaced that the zone of the layer adjoining the inner surface has from 20 to 70% voids.

An advantage of sintered metals is that they are good heat conductors, which is important when it is desired to cool the content of the vessel or at any rate to maintain the lining below a specified temperature, e.g., by passing cold gas through the pores. An inert gas or a gas with good heat conductivity (carbon dioxide or hydrogen gas) may be contained within the pores to promote heat transfer.

If desired, circulation channels for a coolant may also be formed in the porous layer. This may, of course, also be used for heating.

The invention will now be described, illustrated by the drawing showing an embodiment by way of example, wherein:

Figure 1 is a vertical sectional view;

Figure 2 is a transverse sectional view taken on the line 2—2 of Figure 1; and

Figure 3 is a fragmentary view showing a modification providing a side nozzle connection.

The reaction vessel includes an outer cylindrical wall 1. A cylindrical nozzle or end part 2 having a smaller diameter is secured by means of a welded flange 3 to a welded flange 4 at the top of wall 1. This part 2 is sealed by a cover 5, and the bottom of the wall 1 is sealed by a cover 6; these are bolted to welded flanges 7 and 8, respectively. The parts 1, 2, 5 and 6 may be made of any suitable impervious material, preferably metal, e.g., steel. A layer of porous material, formed of separate sections 9, 10, 11 and 12, is suitably secured within the vessel to lie against the inside surfaces of the walls of the parts 1, 2, 5 and 6, respectively. Each of these inserts may consist of one piece, as shown for the parts 9, 11 and 12, or be composite structures, as shown for the part 10 and may, for example be composed of bricks. These inserts may have any of the compositions previously named. As a specific example, the sections may consist of porous concrete, e.g., cement having 25 to 40% voids in the form of pores 200 to 500 microns in diameter.

A pliable lining, e.g., of synthetic material such as Teflon, polyvinyl chloride, rubber, or the like, or a noble metal such as gold, includes foil sections 13, 14, 15 and 16, which lie against the porous layers 9, 10, 11 and 12, respectively. The sections 13 and 14 are tubular in shape and the others are flat. The foil sections are partly secured by clamping the margins thereof between the flanges 3 and 4, between the cover 5 and the flange 7, and between the cover 6 and the flange 8. The wall 1 has pipes 17 and 18 connected to openings near the bottom and top. Pipes 19 and 20 are similarly connected to spaced openings in the part 2, pipe 21 to the cover 5, and pipes 22 and 23 to the cover 6. A helical channel 24 may optionally be formed in the outer part of the porous section 9 with the ends thereof in registry with the wall openings at the pipes 17 and 18.

In each section of the porous layer a gas pressure is maintained which is lower than the pressure in the reaction vessel, using the pipes 17—23 when needed. In this way the lining is made to lie properly against the porous layer, while the lining can nevertheless be replaced in a simple way.

For example, when the pressure within the reaction vessel is above atmospheric the connection 17 and/or 18 may be open to the atmosphere or used to charge a gas into the pores of the section 9 or to evacuate gas therefrom by applying suction. When the interior vessel pressure is equal to or below atmospheric evacuation is necessary. In any event, the gas pressure in section 9 of the porous layer is made lower than the pressure inside the reaction vessel. Essentially all of the outer surface of the lining section 13 is subjected to this pore pressure. After the desired pore pressure in the porous layer has been established, the connections 17 and 18 may be closed. The lining section 13, being subjected over all of its inner surface to the pressure prevailing inside the reaction vessel, which exceeds the pore pressure, is pressed against the section 9, from which it receives well-distributed backing without danger of substantial creep or flow into the small pores, which are also of limited depth.

The connections 17 and/or 18 may also be used for blowing loose a worn lining if it is necessary to replace the latter by a new one. It is also possible to supply an inert gas as coolant via the connection 17 and to withdraw the same gas via the connection 18, whether or not the channel 24 is provided. This channel, when provided, permits the coolant to traverse the section 9 with a negligible pressure drop. Thus a good wall cooling is obtained in a simple way. When the vessel is in use the pressure of the cooling gas flowing through the porous layer should, of course, always be lower than the pressure in the reaction vessel, as otherwise the lining would be blown loose.

The connections 19—23 in the part 2 and the covers 5 and 6, may be used similarly, for pressurizing, evacuation and/or cooling or for blowing the lining loose, and channels like the channel 24 for coolant interconnecting spaced connecting pipes may be provided.

The disclosed construction may be used in all types of vessels, the inside of the walls of which has to be protected against corrosion and/or erosion and in which more or less plastic linings are used which are not capable of being secured to the wall of the vessel, or which can be so secured only with difficulty, and which must be capable of replacement in a rapid and simple way. The support by means of the porous material is advantageous, particularly if the lining is thin and plastic, as this prevents creeping of the lining.

For charging and discharging the vessel the cover 5 may be opened. It is evident that this cover and/or the cover 6 may be replaced by a flanged pipe.

According to the construction shown in Figure 3 the wall 1a has a side opening to which is welded a nozzle 25 which has a flange 26 forming a connector and is lined with porous material 27 adjoining the section 9a and in flow communication therewith. The pliable lining section 13a has an integral nozzle section 28 which extends through the nozzle in engagement with the inner surface of the porous layer 27 and has a flange at the end 29. The parts 1a, 9a and 13a are otherwise constructed as described for Figures 1 and 2. It will understood that the flange of a pipe which is bolted to the nozzle flange 26 presses the flange 29 of the lining sealingly against the nozzle flange and that the pressure within the porous layer 27 of the nozzle is always equal to that prevailing in the section 9a. Hence a suction or pressure applied to the latter section through the pipe 17 or 18 is transmitted to the layer 27.

Reaction vessels according to the invention may be used, for example, for oxidation reactions, as in the terephthalic acid process.

I claim as my invention:
1. A lined vessel including an outer, impervious confining wall defining a hollow vessel, a supporting layer of porous material on the inner surface of said wall, an impervious lining formed as a hollow body lying against said supporting layer, said porous material being cohesive, essentially rigid and pressure-resistant, and having an inner surface adjoining said lining which is substantially continuous save for small pore openings having diameters between 5 and 1000 microns, said pores being in communication with one another within said layer, and means for maintaining the pressure within said pores lower than the pressure prevailing within the hollow lining body during use of the vessel, said lining being formed of thin material which is pliable throughout the extent thereof and being pressed against said supporting layer essentially without flow solely by the pressure difference prevailing between opposite surfaces of the lining.

2. A vessel according to claim 1 wherein the lining is a synthetic material in the form of a thin foil which is plastic under the condition of use of the vessel.

3. A vessel according to claim 1 wherein said outer wall has a pair of spaced passages extending therethrough and said porous layer is formed with a channel extending between said passages and spaced from said inner surface thereof for the circulation of a coolant.

4. A vessel according to claim 1 wherein said porous material is sintered material.

5. A vessel according to claim 4 wherein said sintered material is metal.

6. A vessel according to claim 4 wherein said sintered material is a ceramic.

7. A vessel according to claim 1 wherein said porous material is stony material.

8. A vessel according to claim 7 wherein said stony material is a concrete.

9. A lined vessel according to claim 1 including a flanged nozzle which includes: a tubular, impervious nozzle connected in sealed relation to said impervious outer wall at an opening therein, said nozzle having a connector at the outer end thereof; a supporting tubular layer of a pressure-resistant, porous material covering the inner surface of said nozzle, said supporting layer having pores which are in communication with each other and with the pores of the supporting layer specified in claim 1; and a tubular section of a pliable, impervious lining lying against the inner surface of said supporting tubular layer and joined in sealed relation to the impervious lining specified in claim 1 at an opening therein, the outer end of said tubular section of lining being sealed against the outer part of said nozzle.

References Cited in the file of this patent
UNITED STATES PATENTS

| | | |
|---|---|---|
| 1,394,955 | Von Recklinghausen | Oct. 25, 1921 |
| 1,673,918 | Mauran | June 19, 1928 |
| 1,709,701 | Althoff | Apr. 16, 1929 |
| 1,835,699 | Edmonds | Dec. 8, 1931 |
| 1,924,832 | Brandt | Aug. 29, 1933 |
| 1,993,500 | Benner | Mar. 5, 1935 |
| 2,078,530 | Courtright | Apr. 27, 1937 |
| 2,267,918 | Hildabolt | Dec. 30, 1941 |
| 2,503,339 | Jandus | Apr. 11, 1950 |
| 2,545,384 | Rehrig | Mar. 13, 1951 |
| 2,633,414 | Boivinet | Mar. 31, 1953 |
| 2,709,496 | Baker | May 31, 1955 |
| 2,772,860 | Nelson | Dec. 4, 1956 |
| 2,783,195 | Raynes | Feb. 26, 1957 |